United States Patent
Gordon et al.

(10) Patent No.: US 7,310,729 B2
(45) Date of Patent: Dec. 18, 2007

(54) DIGITAL RIGHTS MANAGEMENT LICENSE DELIVERY SYSTEM AND METHOD

(75) Inventors: Michael Gordon, Paradise Valley, AZ (US); Nathan Raciborski, Phoenix, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 740 days.

(21) Appl. No.: 10/386,766

(22) Filed: Mar. 12, 2003

(65) Prior Publication Data

US 2004/0181490 A1    Sep. 16, 2004

(51) Int. Cl.
*H04L 29/00* (2006.01)
(52) U.S. Cl. .................................. 713/161
(58) Field of Classification Search ............... 713/161, 713/164, 189; 726/30
See application file for complete search history.

(56) References Cited

U.S. PATENT DOCUMENTS

| | | | | |
|---|---|---|---|---|
| 6,360,254 | B1 * | 3/2002 | Linden et al. | 709/219 |
| 6,792,113 | B1 * | 9/2004 | Ansell et al. | 380/284 |
| 6,824,051 | B2 * | 11/2004 | Reddy et al. | 235/380 |
| 6,990,502 | B2 * | 1/2006 | Waxman et al. | 707/104.1 |
| 7,047,411 | B1 * | 5/2006 | DeMello et al. | 713/176 |
| 2002/0002674 | A1 | 1/2002 | Grimes et al. | |
| 2002/0034302 | A1 * | 3/2002 | Moriai et al. | 380/270 |
| 2002/0049679 | A1 * | 4/2002 | Russell et al. | 705/52 |

OTHER PUBLICATIONS

Architecture of DRM—Windows Media Technologies, pp. 1-3, www.microsoft.com/windows/windowsmedia/wm7/drm/architecture.asp, retrieved Sep. 24, 2002.

* cited by examiner

*Primary Examiner*—Kambiz Zand
*Assistant Examiner*—Andrew L Nalven
(74) *Attorney, Agent, or Firm*—John D. Titus

(57) ABSTRACT

A system for Digital Rights Management (DRM) license delivery is presented in which the license and encrypted content is accessed from a unique download URL address for each unit of encrypted content for each subscriber. The license is delivered only a limited number of times from each URL (typically once, but optionally more than once) and is delivered to the client system that first accesses the URL (or if more than one license delivery is authorized by the content owner or distributor) to the same or different client system that accesses the URL up to the maximum number of license delivery events authorized.. When the subscriber is ready to view the content, the subscriber clicks on the download URL to cause the browser for the subscriber client system to request the web page located at the unique URL location. In response to the request, the host system delivers a license and the encrypted content to the subscriber client system that accessed the URL. If the unique download URL is accessed subsequent times, the host system delivers the encrypted content, but does not re-deliver the license. Since the subscriber client system has already stored the license, if the subscriber client system re-accesses the site, it will be able to download and play the media content for so long as the terms of the license permit. However, if another client system accesses the unique URL address, for example if the subscriber e-mails the URL address to another user, the content can be downloaded but will not be played by the subsequent client system because the license is not re-delivered.

13 Claims, 2 Drawing Sheets

DIGITAL RIGHTS MANAGEMENT LICENSE DELIVERY SYSTEM AND METHOD

BACKGROUND OF THE INVENTION

The present invention relates to digital media distribution. In particular, this invention relates to the distribution of licenses to access digital media content distributed over a computer network.

Digital media content, as opposed to analog media, is susceptible to infinite reproduction while maintaining intact the quality of each replica. As such, digital media content is easily distributed over computer networks, which provide a medium for low-cost delivery of content to consumers with legitimate rights to access the content. Unfortunately, computer networks also provide a medium for piracy, unauthorized use, and illegal distribution of digital media content. A well-recognized example of a computer network is the Internet. The Internet has revolutionized the media industry by providing content owners the ability to distribute media to the consumer in an effective and expedient fashion. Additionally, Internet-based distribution of media content benefits consumers in that they have at their fingertips a wide selection of digital media content that is immediately available. Unfortunately, the advent of the Internet has also accelerated the illicit duplication of copyright-protected digital content. Faster computer processors, affordable storage capacity, widespread Internet usage and the advent of peer-to-peer file sharing networks have not only allowed consumers to acquire and play media files legitimately, but also to share them with unauthorized consumers.

A leading solution to this problem is Digital Rights Management ("DRM") technology. In broad terms, DRM is a media distribution scheme that permits content owners to securely distribute media content to consumers through the use of digital licenses. DRM differs from traditional methods of encrypted media distribution in that DRM technology allows a content owner to keep control of the number of times content decryption may occur, the time period during which content decryption is available, the user's ability to make copies or to transfer the media object to another device, and other aspects of the use of the media. Traditional methods of encrypted media distribution deliver the media file and lose control of the content once the file is decrypted.

Application of a typical DRM system involves a subscriber, a content owner, a content distributor, and a license server. A subscriber is generally the media consumer who through a client computer requests, obtains, and plays media content. The internal programming of the media player (e.g. Microsoft® Windows Media Player) requires the subscriber to have a valid license to play the media content if the media content is coded with such a requirement. A content owner is an entity with rights over any form of intangible property such as digital media content. Examples of content owners include media companies, record labels, filmmakers, and recording artists. Content distributors are media retailers who most often distribute media content through their Internet website by content streaming or content downloading. In some cases, the content owner will distribute its own content in which case it simultaneously serves as a content distributor. Finally, a license server is the server that receives license requests from the subscriber's media player and downloads digital licenses to authorized consumers. A digital license contains the necessary decryption key as well as business model rules (such as the number of times the media file can be played and the expiration period of the license), which can be set by the content distributor.

The usual flow of events for media distribution employing a DRM system starts with a content owner who encrypts its media content with a key and packages it with information such as the content ID and the license acquisition universal resource locator ("LAURL"). The content ID is the identifier of the media file. The LAURL is the URL that points to the license server and allows the subscriber's computer to acquire a license if one is needed (i.e., is not already present on the computer system). Once the content owner packages the media content, it may transfer the media content to the content distributor. At this point the digital media is ready for distribution. Using preferred business models, the content distributor markets the media content to subscribers. A consumer who has subscribed to the content will then go to the content distributor website and download or stream the packaged media file. Depending on the architecture of the DRM system, a license to the media may also be delivered to the user's device at this time. The consumer's computer stores the license for future use and the media player then uses the license to decrypt and play the media content. Later attempts to play the media content by the user will cause the user's computer to use the license stored in the consumer's computer. Access will be provided to the media content, allowing it to be played, according to the business rules specified in the license. If the consumer transfers the media content to another consumer or to another device, on the first attempt to play the media content on such a new device, the media player will request a license from the server addressed by the LAURL packaged with the media content (such a request is generally called a challenge). Once the challenge has been successfully met, the license server will generate and download a license to the requesting computer. The consumer's computer stores the license for future use and the media player then uses the license to decrypt and play the media content. Later attempts to play the content by the user will cause the user's computer to use the license stored in the consumer's computer. Access will be provided to the media content, allowing it to be played, according to the business rules specified in the license.

Consumer access to obtain the media content in the first place or to obtain a license via a challenge requires some method of authentication. Consumers are generally required to enter a username and password before gaining access to the content distributor's lists of media content and/or before downloading media content, or before downloading a new license requested via a challenge. For example, after the consumer subscribes with the content distributor, every time she wants to obtain a song from the content distributor's website she enters a username and password and the encrypted media content is delivered to her along with the license. Alternatively, if the license is not delivered with the media content, the consumer's player will request a license and before the license is delivered to the media player, the subscriber will be prompted for username and password. If the consumer is an authorized subscriber the digital license is delivered, which enables the player to decrypt and play the media.

The username-and-password paradigm, however, falls short in protecting network-distributed media and at the same time is unduly cumbersome for the user. The username-and-password paradigm falls short in protecting network distributed media, because a user name and password are easily shared between individuals. Accordingly, a single user who shares her username and password with multiple users can easily enable those multiple users to obtain free copies of the media and the license to decrypt the media. In the extreme, a single user can easily post a username and password on a bulletin board or other electronic location, thereby enabling an unlimited number of other users to obtain playable copies of the media, thus undermining completely the content distributor's ability to generate profit from distribution of the content. At the same time, the username-and-password paradigm is unduly cumbersome because, by definition, it requires the user to identify herself in some manner, when such information is irrelevant to the content distributor, who typically does not need or want to know the identity of each recipient of a single copy of a mass distributed media. Instead, the content distributor wants to receive one royalty for each usable copy of the media distributed irrespective of who purchases the copy. In many cases, the username-and-password paradigm also requires the user to identify herself repeatedly, rather than once, and is therefore overly intrusive, deterring user acceptance. Alternatively, a "cookie"— a small file controlled by the browser but accessible by the server— containing the user name and other information can be stored on the user's computer. Many users, however, resist cookies because of the potential invasion of privacy that results.

Physical media distribution, such as concerts, provides a comparative analogy. In general a concert attendee does not have to identify herself with a password to gain admission. Instead, anyone with a valid ticket is admitted. If a person with a valid ticket wishes to leave and re-enter, however, a hand stamp is used to identify the attendee as she leaves. Subsequently, only that person will be allowed to re-enter the event, which she may do as many times as she wishes. If, on the other hand, the attendee exits and gives her ticket stub to a friend whose hand is not stamped, the friend cannot enter.

In network media distribution, however, because two or more users may use the same username and password (in some systems simultaneously), current state of the art DRM systems do not effectively prevent multiple persons from "entering" the same event using one "ticket." Yet, as noted above, they are intrusive in that they require the user to identify herself with name and password, sometimes multiple times, or require storing cookies on her computer, in order to gain access.

User validation methods for protection of media content are well known in the art. As previously stated, user validation is typically achieved by a combination of a username and a password. Other methods of user validation include using digital tickets that are punched once the consumer receives the digital work, e.g., see U.S. Pat. No. 6,236,971 titled "System for controlling the distribution and use of digital works using digital tickets." While these methods provide content owners with some protection of their media content, they either fail to control the usage of the media file once it has been delivered to the consumer or fail to control the number of users who receive the same media content.

What is needed, therefore, is a mechanism that can be used in network media distribution to "hand-stamp" consumers' computers so that once the media content has been paid for, only one consumer will be allowed to receive it and play it, including receiving it and playing it multiple times, while at the same time avoiding intrusive and annoying username and password queries or other unattractive alternatives.

SUMMARY OF THE INVENTION

The present invention comprises a system for DRM license delivery in which the license and encrypted content is accessed from a unique download URL address for each unit of encrypted content for each subscriber. According to one embodiment, the license is issued before the content is played, rather than through a challenge. The unique download URL is long and randomly generated, to make it difficult— and as a practical matter, impossible— to guess. The license is delivered only a limited number of times from each URL (typically once, but optionally more than once) and is delivered to the client system that first accesses the URL and, if more than one license delivery is opted, to the same or different client system that accesses the URL up to the maximum number of license delivery events opted by the content owner or distributor. Under the present invention, the LAURL may not be used to issue licenses, but instead may be used to return the subscriber to the content distributor's website.

According to an illustrative embodiment of the present invention, once a subscriber has paid for a subscription to a particular media content, the media distributor transmits periodically an e-mail message to the subscriber indicating that new content is available for viewing according to the terms of the subscription. The e-mail message includes a unique download URL for that subscriber. When the subscriber is ready to view the content, the subscriber clicks on the download URL to cause the browser for the subscriber client system to request the web page located at the unique URL location. In response to the request, the host system delivers a license and the encrypted content to the subscriber client system that accessed the URL. The subscriber client system then stores the license. Under this approach, no entry of user name and password is required, and no cookie is stored on the user's computer.

If the unique download URL is accessed subsequent times, the host system delivers the encrypted content, but does not re-deliver the license. Since the subscriber client system has already stored the license, if the subscriber client system re-accesses the site, it will be able to download and play the media content for so long as the terms of the license permit without requesting a user name and password to re-authenticate the user. However, if another client system accesses the unique URL address, for example if the subscriber e-mails the URL address to another user, the content can be downloaded but will not be played by the subsequent client system because the license is not re-delivered.

According to one illustrative embodiment of the present invention, the unique URL is accessed simply by the client system browser requesting the page contained in the e-mail message to the subscriber without the need for the subscriber to enter a username and password. According to another embodiment, in lieu of the e-mail message containing the unique URL address, the content provider may have a web site that is accessed by the subscriber via conventional username and password protocol. Upon entry of a valid username and password, the web page delivers to the client system the encrypted media and license. Subsequent requests using the same username and password will cause the host system to deliver only the encrypted media. As with the previous embodiment since the subscriber client system stores the license, the subscriber system will be able to download and play the content for so long as the terms of the digital license permit. If another client system subsequently accesses the web page using the same username and password, however, the subsequent client system will not be able to play the content because the license is not re-delivered.

Optionally, at the discretion of the content distributor, the license may be re-delivered a limited number of times, for example, to allow a subscriber to access the content from multiple devices, with the corresponding risk that the subscriber may actually be sharing her username and password with other subscribers. This trade-off represents a business decision to be made by the content owner. Additionally, the license may be personalized to the client system requesting the license in order to further ensure that the license cannot execute on another device, is not shared with non-subscribers, even in the event the subscriber is able to copy the license from the media player's storage file.

BRIEF DESCRIPTION OF THE DRAWINGS

The above and other objects, aspects, features, and attendant advantages of the present invention will become apparent from a consideration of the ensuing detailed description of the presently preferred embodiment and methods thereof, taken in conjunction with the accompanying drawings, in which.

DESCRIPTION OF PREFERRED
EMBODIMENTS AND METHODS

Figure 1:
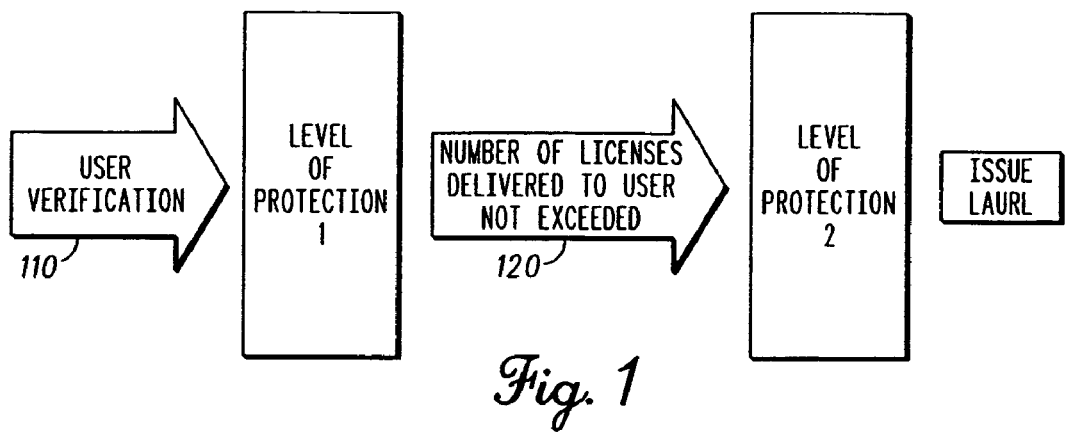
FIG. 1 is a flow chart showing the steps in issuing a digital license in an illustrative embodiment incorporating features of the present invention.
Figure 2:
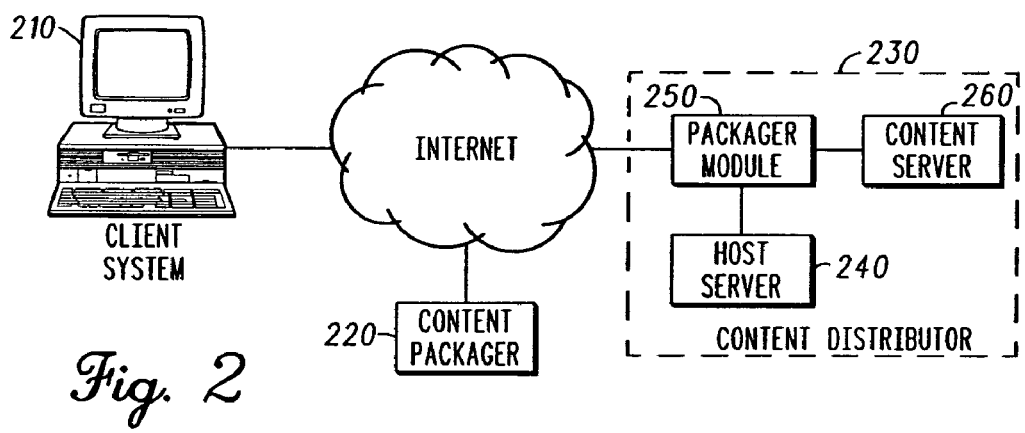
FIG. 2 is a diagram showing the high-level architecture of the media distribution system in an illustrative embodiment incorporating features of the present invention.

The present invention comprises a system for Digital Rights Management (DRM) license distribution control. As shown in FIG. 1, in an illustrative embodiment of the present invention the system provides for two requirements that a subscriber must meet before he gets a license: first, a subscriber must be a valid subscriber (step 110); secondly, the subscriber must not already have received more than the allowable number of licenses (which might be only one license) (step 120). Prior technology mandated only the first requirement. Through this two-step process, the present invention limits the number of licenses that will be issued for any valid subscriber. At the second level, if a subscriber (even if the subscriber is a valid one) has already requested her quota of licenses for the media, the subscriber will simply not receive any additional licenses. Thus, the second requirement introduced by the present invention effectively controls the number of licenses that a given subscriber may acquire.

The illustrative embodiment of the present invention disclosed herein is an Internet-based system that integrates a content distributor host system 230, a content packager server 220, and a client system 210, which is the subscriber's computer. The content distributor system includes a packager module 250, a content server 260, and a host server 240. The client system interfaces through the Internet with the host server, which in turn interfaces with the content server through the packager module. This scheme is beneficial because it allows for the content server to be private, and therefore protects it from any hacking attempts and risks of losing stored media content.

The host server maintains subscriber account information such as e-mail addresses, subscription options and duration and other information necessary to make the content available to the subscriber in accordance with the subscription. The host server also administers the number of licenses available to a subscriber. In the illustrative embodiment, the content packager does not use or manage any subscriber information. Its function is limited to packaging the media content when appropriate. As a result, subscriber information is never interchanged between the content packager and the content distributor, which is another benefit of the present illustrative embodiment.

Figure 3:
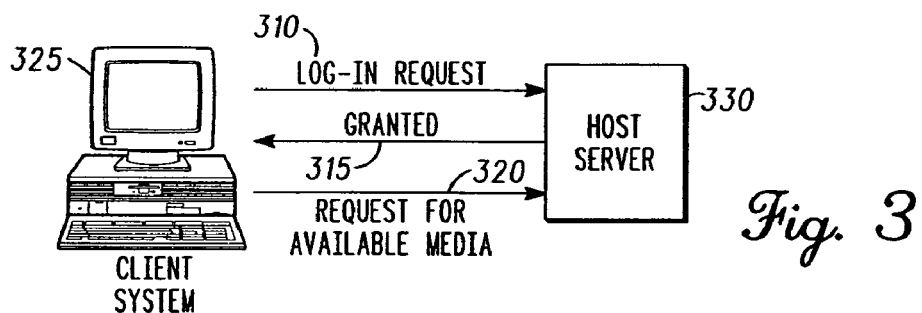
FIG. 3 is a diagram of a scenario in which a client system attempts to gain access to a host server in an illustrative embodiment incorporating features of the present invention.

In the illustrative embodiment of FIG. 3 the client system sends a request (step 310) to access the host server. If the client system meets the prerequisites, the request is granted (step 315). The client system then requests (step 320) a list of the media available for download. The host server generates the list of media available to the subscriber according to her initial agreement with the content distributor. Each element in the list has associated with it a common name URL of a given media file. As shown in the illustrative embodiment of FIG. 4, in response to the request for the list of available media, the host server forwards (step 400) the list of common name URLs to the packager module. The packager module takes each of the common name URLs and randomly generates a new and unique download URL (step 410) that points to the media file stored in the content packager. The packager module then stores the unique name URLs in memory and their mapping to the common name URLs. It also responds (step 420) to the host server with the list of unique URLs to be delivered to the subscriber. Once the unique URLs have been generated, the packager module requests (step 430) from the content server the media content that is associated with each of the common name URLs if the packager module does not already have a copy of the media content for that common name URL. The content server sends (step 440) to the packager module the media files requested and, in turn, the packager module sends (step 450) the unencrypted media files to the host server.

Figure 5:
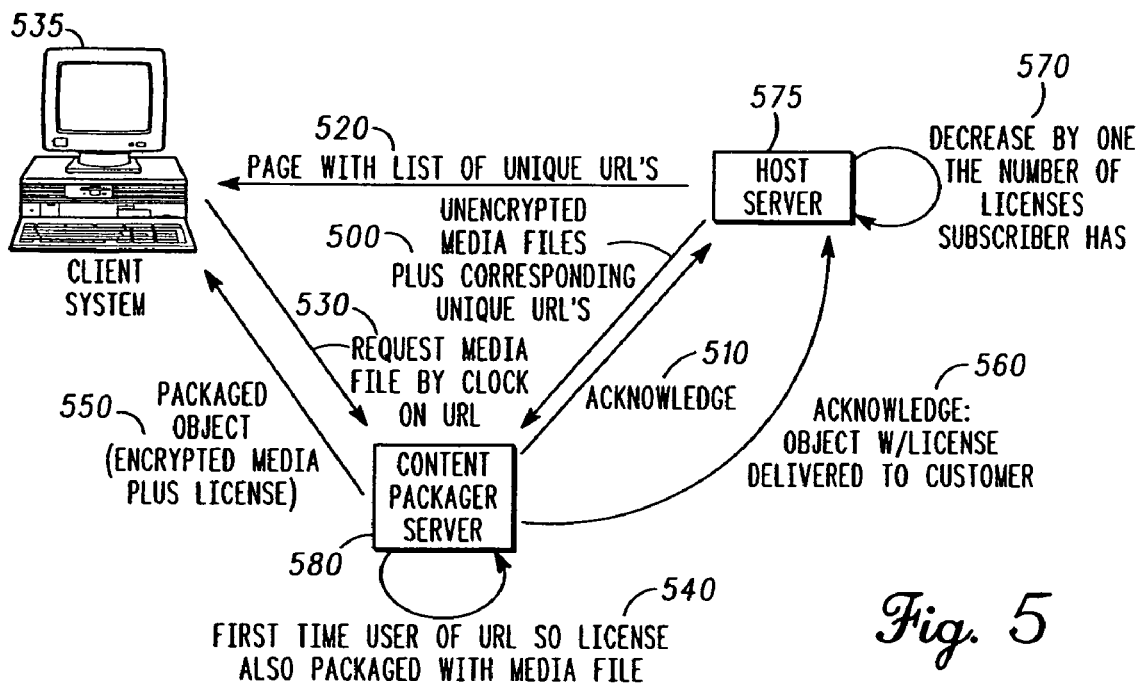
FIG. 5 shows a partial diagram of the messaging between system components where a subscriber has one or more licenses available in an illustrative embodiment incorporating features of the present invention.

Subsequently, as show in the illustrative embodiment of FIG. 5, the host server then sends the media files along with the corresponding unique name URLs to the content packager (step 500). The content packager then stores each media file and its unique name URL until the subscriber requests the media file. After storing the media content, the content packager acknowledges (step 510) the receipt of the media content which triggers the user server to send (step 520) the list of URLs to the subscriber. The list of unique URLs is generally delivered to the subscriber in the form of a web page. The subscriber may now click on the received URLs to obtain and play the media content. Once the subscriber "clicks" (step 530) on a unique URL, the subscriber's browser directs its request for media content to the content packager. The content packager receives the request and searches in its memory for whether there has been a previous request with the same URL. Since the subscriber is requesting media content for the first time, the content packager will not find any previous requests for media content with the URL provided (step 540). As a result, the content packager will deliver the license and the media content to the subscriber's computer (step 550). The license is then stored in the subscriber client system, which allows the client system to play the content for as long as the license terms extended in the license key permit.

Figure 4:
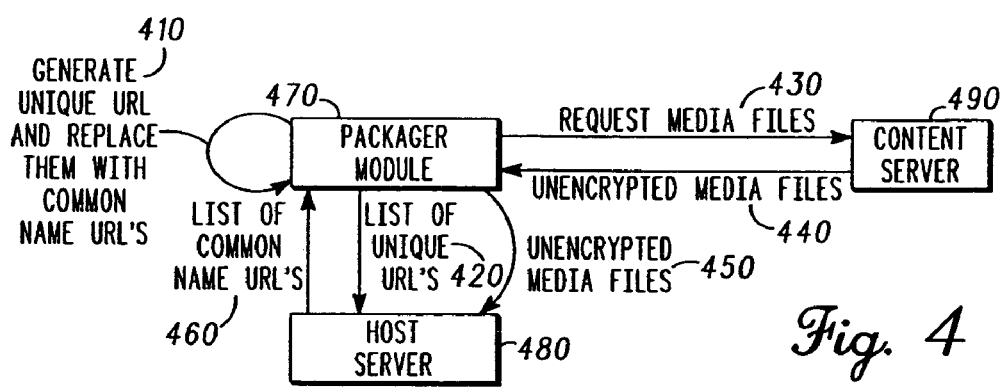
FIG. 4 shows a partial diagram of the messaging between system components where a subscriber has one or more licenses available in an illustrative embodiment incorporating features of the present invention.

At the option of the media content distributor, or according to the provisions of the subscriber agreement, a single subscriber may be authorized to obtain a second license for the same media. FIGS. 3, 4, and 5 illustrate the messaging between the system components when a subscriber attempts to access media for the first time. The same mechanism shown in these figures occurs when a subscriber requests another license for the same media object and the subscriber is authorized to do so. If a subscriber is indeed eligible to obtain more than one license for the same media object, the packager module will issue a new unique URL and a new transaction for that subscriber. The new unique URL is then sent to the content packager along with the media file (step 500), and the content packager will treat the subsequent subscriber request for the same object as a new transaction, thus issuing a new license to the subscriber (step 550). It is therefore transparent to the content packager whether the user requesting the media file is an old subscriber who previously requested the same media content or a new subscriber who has not requested that media file before. For example, if Carl, a fictitious subscriber, purchases two licenses for the song "From my heart," he may log onto the content distributor's website and download the song, acquire the license and play it in his work computer. Carl may decide to have a copy of "From my heart" at home. For that purpose, Carl would log onto the content distributor's website and download the song to his home computer. Alternatively, Carl may log onto the content distributor's website at his workplace, get the unique URL, and email himself the text of the URL so that he can use the URL from home. Independently of how Carl chooses to use his second license, on his second download the content packager treats Carl's media request as a new transaction because the unique URL it receives from the content distributor is new. Yet another alternative for Carl is to send "From my heart" to his wife Joan. Thus Carl may obtain the unique URL, and without clicking it, send it to Joan. Joan could click on the URL and the content packager would send the encrypted media file and the license to Joan. Whether Carl uses his second license to download a copy of the song at home, or to give a copy of the song to Joan, the present invention successfully restricts the use of the media file to two computers in accordance with the subscription license provisions, while providing consumers with the same flexibility they have with physical media purchases.

Figure 6:
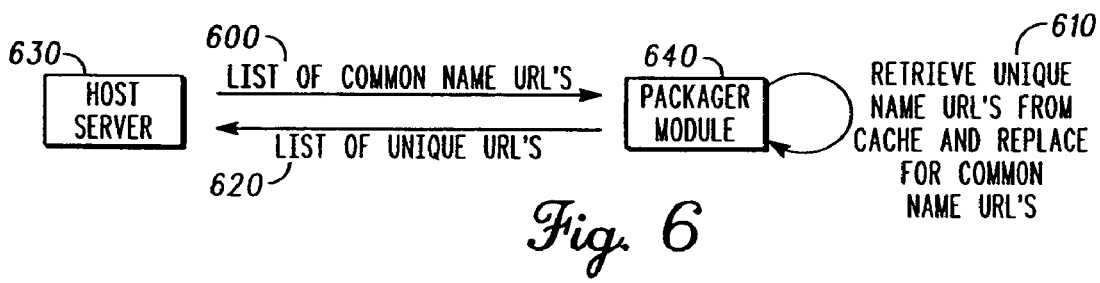
FIG. 6 shows a partial diagram of the messaging between system components where a subscriber has no licenses available in an illustrative embodiment incorporating features of the present invention.
Figure 7:
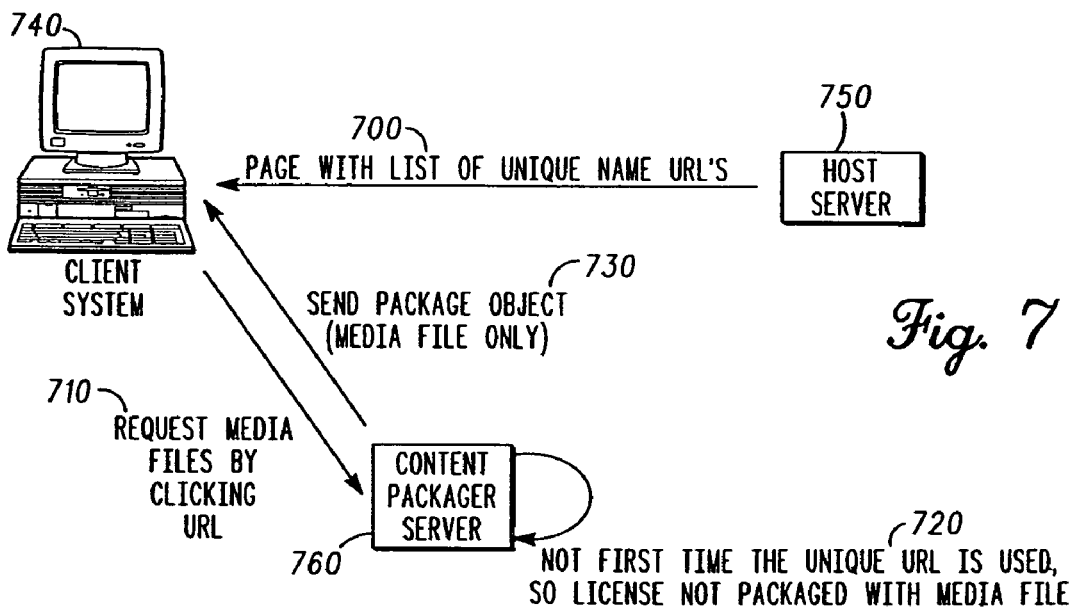
FIG. 7 shows a partial diagram of the messaging between system components where a subscriber has no licenses available in an illustrative embodiment incorporating features of the present invention.

FIGS. 6 and 7 illustrate the messaging between the system components when a subscriber attempts to play previously obtained media content but has no rights to acquire another license to play the media content. In general, if a subscriber has one license, once she downloads the media file and acquires the license, any subsequent attempts to obtain another copy of the media file will result in obtaining the media file without the license. The illustrative embodiment in FIG. 6 shows how after the subscriber requests the list of available media and the host server sends the list of common name URLs to the packager module 600, the packager module maps the common name URLs to the corresponding unique name URLs that were previously generated 620. The packager module does not need to send the mapped unique URL or the media file to the content packager server because the content packager server already has the unique URL and the associated media file from a previous transaction. If the subscriber then requests a media file 710 the content packager will search in a stored list of previously received URLs and will recognize the URL used by the subscriber as one that has been used in the past to request a media file 720. Therefore the content packager will package the media file without the license and send the media file to the requesting computer, which is the subscriber client system 730.

Finally, the illustrative embodiment in FIGS. 6 and 7 similarly apply to situations where the subscriber shares his log-in information with a non-subscriber consumer. If the non-subscriber logs into the subscriber account and requests a list of available media, the packager module maps the common name URL to a previously generated unique URL stored in memory because the subscriber does not have any more licenses available to download (step 610). The non-subscriber then receives the same unique URL that the subscriber used previously to obtain the media file (step 700). If the non-subscriber clicks on the URL in an attempt to obtain the media content (step 710), the content packager server will deliver the media content, but not a license to the requestor's computer, which is the non-subscriber client system (step 720). Since the non-subscriber client system does not have a license stored the non-subscriber client system has in effect non-playable media content stored in his computer.

Although certain illustrative embodiments and methods have been disclosed herein, it will be apparent from the foregoing disclosure to those skilled in the art that variations and modifications of such embodiments and methods may be made without departing from the true spirit and scope of the invention. For example, another embodiment of this invention may include a system in which the subscriber automatically receives unique URLs via electronic mail whenever new media is available. Accordingly, it is intended that the invention shall be limited only to the extent required by the appended claims and the rules and principles of applicable law.

What is claimed is:

1. A system for digital rights management comprising:
   a client computer having software for receiving and playing encrypted media content, said client computer further having software for transmitting a request to a server to obtain said encrypted media content;
   a host computer system, said host computer system including a server having software for mapping a plurality of unique unencrypted logical addresses to a single logical address, said single logical address pointing to a unit of encrypted media, said host computer system further having software for determining the number of times delivery of said unit of encrypted media is requested from each of said plurality of unique logical addresses and for determining whether the number of requests for said unit of encrypted media from each of said plurality of unique logical addresses exceeds a predetermined license delivery event limit and, if the number of requests for said unit of encrypted media from one of said plurality of unique logical addresses does not exceed said predetermined license delivery event limit, authorizing the transmittal of a digital rights management license to decrypt said unit of encrypted media to said client computer.

2. The system of claim 1, further comprising:
   software associated with said host computer system for encrypting said encrypted media content with a public key infrastructure (PKI) key pair.

3. The system of claim 1, wherein:
the host computer system software further comprises instructions for determining a hardware profile of the client computer, wherein the encrypting instruction encrypts the encryption key with the hardware profile of the client computer.

4. A method of providing encrypted media and licenses to decrypt said encrypted media to a plurality of users, comprising the steps of:
providing a unit of encrypted media content to a host computer, said unit of encrypted media content being encrypted with an encryption key;
mapping said unit of encrypted media to a plurality of unique logical addresses;
providing one of said plurality of unique logical addresses to a client computer;
transmitting a first request from said client computer to retrieve said unit of encrypted media from said one of said plurality of unique logical addresses;
in response to said first request for said unit of encrypted media, transmitting said encrypted media content to said client computer; and
in response to said first request to retrieve said unit of encrypted media, determining whether the number of licenses transmitted to decrypt said unit of encrypted media content from said one of said plurality of unique logical addresses exceeds a predetermined license delivery event limit and, if the number of licenses transmitted to decrypt said media content associated with said one of said plurality of unique logical address does not exceed said predetermined license delivery event limit, transmitting a license to decrypt said encrypted media content to said client computer.

5. The method of claim 4, wherein
said plurality of unique logical addresses comprise a plurality of unencrypted URLs.

6. The method of claim 4, wherein:
the step of mapping said encrypted media to a plurality of unique logical addresses comprises generating a unique URL for each of a group of individuals of said plurality of users and mapping said encrypted media to each of said unique URLs.

7. The method of claim 6, wherein:
the step of providing one of said plurality of unique logical addresses to a client computer comprises transmitting each of said unique URLs to a corresponding one of said plurality of users.

8. The method of claim 7, wherein:
The step of transmitting each of said unique URLs to a corresponding one of said plurality of users comprises transmitting said unique URLs to plural of said plurality of users via e-mail.

9. The method of claim 7, wherein:
The step of transmitting each of said unique URLs to a corresponding one of said plurality of users comprises transmitting said unique URLs to plural of said plurality of users via a web site.

10. The method of claim 4, wherein:
said predetermined license event limit is between one and two license events per unique logical addresses.

11. The method of claim 4, wherein:
the step of transmitting a license to decrypt said encrypted media content to said client computer is effected without requesting a username, password, or payment information from said client computer.

12. The method of claim 4, further comprising the step of:
determining a hardware profile of the client computer and, wherein the encrypting step encrypts the decryption key with the hardware profile of the client computer to create a decryption key personalized to the client computer.

13. The method of claim 4, further comprising the step of:
transmitting a second request from a client computer to retrieve said unit of encrypted media from said one of said plurality of unique logical addresses; and
in response to said second request to retrieve said unit of encrypted media, determining whether the number of licenses transmitted to decrypt said unit of encrypted media content from said one of said plurality of unique logical addresses exceeds a predetermined license delivery event limit and, if the number of licenses transmitted to decrypt said media content associated with said one of said plurality of unique logical address exceeds said predetermined license delivery event limit, transmitting said unit of encrypted media without a license to decrypt said encrypted media content to said client computer.

* * * * *